United States Patent [19]
Wildermuth et al.

[11] Patent Number: 5,200,971
[45] Date of Patent: Apr. 6, 1993

[54] GAS LASER WITH LONGITUDINAL FLOW

[75] Inventors: Eberhard Wildermuth, Fellbach; Hartwig Von Buelow, Tuebingen; Wolfram Schock, Boeblingen; Joerg Porath, Hamburg; Klaus Schanz, Reinbek, all of Fed. Rep. of Germany

[73] Assignees: Deutsche Forschungsanstalt fuer Luft- und Raumfahrt e.V., Bonn; Rofin-Sinar Laser GmbH, Hamburg, both of Fed. Rep. of Germany

[21] Appl. No.: 824,117

[22] Filed: Jan. 23, 1992

[30] Foreign Application Priority Data

Jan. 25, 1991 [DE] Fed. Rep. of Germany ....... 4102123

[51] Int. Cl.$^5$ .............................................. H01S 3/22
[52] U.S. Cl. .......................................... 372/58; 372/93
[58] Field of Search ........................ 372/58, 59, 92, 93

[56] References Cited

U.S. PATENT DOCUMENTS 4,873,695 10/1985 Bronet et al. .......................... 372/58
5,014,282 5/1991 Herizger et al. ....................... 372/58

OTHER PUBLICATIONS

Article in periodical *Elektronik*, vol. 15, p. 23, Jul. 24, 1987.

Primary Examiner—Leon Scott, Jr.
Attorney, Agent, or Firm—Barry R. Lipsitz

[57] ABSTRACT

In order to improve a high-frequency excited gas laser with longitudinal flow, comprising a discharge channel having laser gas flowing therethrough in a direction of flow and high-frequency electrodes arranged on both sides of the discharge channel for generating a high-frequency discharge transversely to the direction of flow, such that a high output can be achieved with this laser in a manner which is, constructionally, as simple as possible and that its design is, at the same time, as compact as possible, it is suggested that the discharge channel comprise a plurality of channel elements, the channel axes of which are aligned parallel to one another in the direction of flow, that the channel elements be arranged beside or next to one another in a direction of installation transverse to the direction of flow and that the channel elements have a cross section having a greater extension in a first cross direction at right angles to the direction of flow than in a second cross direction extending at right angles to the first cross direction and to the direction of flow.

29 Claims, 3 Drawing Sheets

GAS LASER WITH LONGITUDINAL FLOW

The invention relates to a high-frequency excited gas laser with longitudinal flow, comprising a discharge channel having laser gas flowing therethrough in a direction of flow and high-frequency electrodes arranged on both sides of the discharge channel for generating a high-frequency discharge transversely to the direction of flow.

Such a high-frequency excited gas laser with longitudinal flow is known. In a gas laser with longitudinal flow of this type, the discharge channel is a round channel which has gas flowing through it in its longitudinal direction and is also penetrated in its longitudinal direction by a bundle of beams from a resonator.

To increase the laser output it is necessary to increase the volume of the excited laser gas. In a gas laser with longitudinal flow, for example, this leads to the cross section of the round discharge channel being enlarged. This again entails problems with the high-frequency excitation, in particular when this is intended to be substantially homogeneous over the entire cross section of the discharge channel.

The object underlying the invention is, therefore, to improve a high-frequency excited gas laser with longitudinal flow of the generic type such that a high output can be achieved with this laser in a manner which is, constructionally, as simple as possible and that its design is, at the same time, as compact as possible.

This object is achieved, in accordance with the invention, for a high-frequency excited gas laser with longitudinal flow of the type described at the outset in that the discharge channel comprises a plurality of channel elements, their channel axes being aligned parallel to one another in the direction of flow, that the channel elements are arranged beside or next to one another in a direction of installation transverse to the direction of flow and that the channel elements have a cross section having a greater extension in a first cross direction at right angles to the direction of flow than in a second cross direction extending at right angles to the first cross direction and to the direction of flow.

The inventive concept provides the possibility of constructing, in a simple manner, a discharge channel which is suitable for a large laser output. The simple construction of this discharge channel results not only from the fact that the channel elements are aligned with their channel axes parallel to one another in the direction of flow and arranged beside or next to one another but also, and in particular, from the fact that the channel elements have a cross section which, in the first cross direction at right angles to the directions of flow, has a greater extension than in a second cross direction extending at right angles to the first and to the direction of flow since, for such a design of the channel elements, it is more simple to arrange these next to one another. Moreover, the channel elements designed in this way have the advantage that they can be arranged beside one another in a very compact manner.

It is particularly advantageous within the scope of the inventive solution for the first cross direction to extend parallel to the direction of installation so that the channel elements have a greater extension in the direction of installation than at right angles hereto.

Alternatively, it is also possible for the second cross direction to extend parallel to the direction of installation. Optimum conditions may be achieved in respect of the high-frequency discharge in the laser gas when the high-frequency discharge extends parallel to the second cross direction since the channel elements have a smaller extension in this direction and it is very easy to keep the high-frequency discharge stable when the expansion of the laser gas in the direction of the high-frequency discharge is as small as possible. Moreover, this embodiment provides the possibility of designing the channel elements with any optional extension in the first direction without any negative influence on the high-frequency discharge occurring.

It is particularly favourable within the scope of the inventive solution for the high-frequency discharge to be essentially constant in the direction parallel to the first cross direction.

This can also be achieved in a simple manner by having the high-frequency discharge extend in the direction of the second cross direction, i.e. through the smaller expansion of the laser gas, so that the stabilization in the direction of the first cross direction does not pose any problems at all.

With respect to the arrangement of the electrodes required for the high-frequency discharge, which is explained in detail at a later stage, it is advantageous for the high-frequency discharge to extend at right angles to the direction of installation since, in this case, the electrodes can be essentially arranged in a plane parallel to the direction of installation and, therefore, not influence or interfere with each other.

Alternatively, it is conceivable for the high-frequency discharge to extend parallel to the direction of installation. In this case, the channel elements are positioned such that the high-frequency electrodes of adjacent channel elements must be arranged facing one another. This creates a compact solution only when the electrodes arranged opposite one another have the same potential.

The conditions relating to the high-frequency discharge described above can be achieved in a particular simply manner when the channel elements have flat inner wall surfaces extending parallel to the first cross direction and lying opposite one another since this is the simplest prerequirement for a high-frequency discharge which is essentially constant in the first cross direction.

In order to achieve a high-frequency discharge which is as constant as possible right into the lateral wall regions, it is, furthermore, advantageous for the channel elements to have inner wall surfaces extending parallel to the second cross direction and lying opposite one another.

In particular with respect to the construction of the inventive discharge channel being as compact as possible, it is favourable for the channel elements to have on opposite sides flat outer wall surfaces extending at right angles to the direction of installation so that the channel elements can be arranged beside one another in the direction of installation.

Moreover, the compactness of the construction may be additionally improved when the channel elements have on opposite sides flat wall surfaces extending parallel to the direction of installation.

In a particularly preferred embodiment, the channel elements have an essentially rectangular inner cross section and, altogether, the channel elements are preferably such that they have an essentially rectangular cross section.

In order to provide a high-power laser with a construction which is as compact as possible and a high output, the channel elements are penetrated by a bundle of beams having a cross section essentially adapted to the inner cross section of the channel elements since, with such a bundle of beams, the entire excited laser gas is used in an optimum manner for laser activity and regions of the gas discharge, which are excited but make no contribution to the laser beam, do not result.

In addition, it is advantageous for the bundle of beams to extend in a meandering manner through channel elements located next to one another.

It is particularly advantageous in this connection for the channel elements to be penetrated by a bundle of beams from an instable resonator.

In the embodiments of a gas discharge laser with longitudinal flow described thus far, no details have been given as to how the discharge channel is to be supplied with laser gas for flowing therethrough. In an advantageous embodiment, the discharge channel has a plurality of passageways extending on both sides of a laser gas channel and away therefrom, and being arranged in pairs to align with one another with their passageway axes. In this respect, it is particularly advantageous for the laser gas channel to extend in the direction of installation and so create a connection between all the passageways in this direction.

Moreover, in an additional, preferred embodiment, an outer laser gas channel is arranged at both outer sides of the discharge channel and each laser gas channel is followed, on the opposite side to the discharge channel, by a mirror chamber. The arrangement of the mirror chambers and the supply of the passageways of the discharge channel with laser gas may be accomplished in a simple manner with this configuration.

In this respect, it is particularly favourable for the outer laser gas channels to be laser gas supply channels since, in this case, the mirrors in the mirror chambers can be protected against soiling in a simple manner.

Within the scope of the embodiments described thus far no details have been given concerning the design of the channel elements as such. In a preferred embodiment, the channel elements are of identical design. In this case, it is possible for a discharge channel to be produced cheaply and efficiently with as many channel elements as required. In particular, it is possible to construct a discharge channel for the most varied laser outputs in a simple manner.

With respect to the design of the channel elements themselves, it is particularly favourable for the channel elements to have a self-supporting structure since this dispenses with all the measures necessary to give the channel elements the required stability.

It is expedient for the channel elements to have an upper and a lower transverse wall and supporting webs keeping these walls spaced from one another, all these elements together forming a continuous part.

For reasons of stability and tightness of the channel elements, in particular, these are preferably designed such that they form integral parts.

Moreover, the design of the channel elements as self-supporting parts can be advantageously utilized even further in that the channel elements bear the electrodes so that no additional mechanical constructions are necessary to hold the electrodes. This is of advantage, in particular, in view of the problems with voltage sparkovers occurring during high-frequency excitation.

The inventive solution may be constructed in a particularly compact manner when the channel elements are located immediately beside or next to one another in the direction of installation.

In all the embodiments described so far no details have been given as to how the channel elements are joined to the discharge channel. In a particularly advantageous, mechanical construction, the channel elements are connected with one another by supporting, elements. The supporting elements are expediently designed such that the channel elements abut at their end faces on wall plates.

The discharge channel can be constructed in a particularly simple manner when all the channel elements arranged next to one another in the direction of installation abut with their respective end faces on a common wall plate so that all the channel elements located beside one another in a direction of installation are arranged between two wall plates.

The channel elements can be advantageously fixed in position between the wall plates by having the wall plates held by anchoring rods so as to be tensioned towards one another.

In order to achieve a seal between the channel elements and the wall plates which is as advantageous as possible and also constructionally simple, the channel elements have in their end faces openings with a sealing surface located in a plane and encircling the openings in one piece and, in particular, the wall plates also have, around their openings corresponding to the openings in the respective end faces of the channel elements, sealing surfaces located in a plane and encircling these openings in one piece.

Additional features and advantages of the invention are the subject matter of the following description as well as of the drawings of several embodiments. In the drawings, FIG. 1 is a perspective, partially broken open, overall view of one embodiment;

Figure 1:
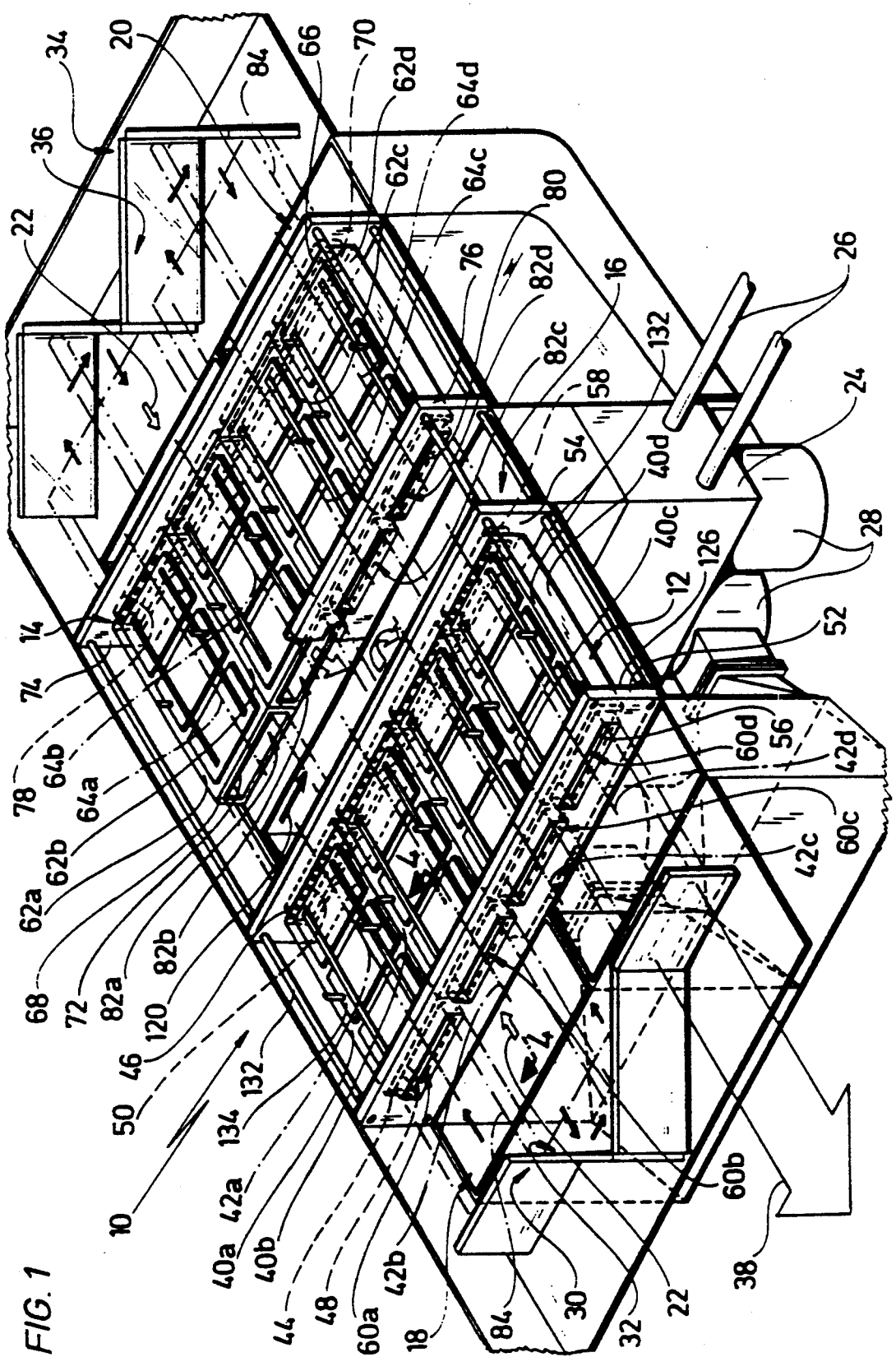

One embodiment of an inventive high-frequency excited gas laser with longitudinal flow comprises a discharge channel designated as a whole as 10 and which is constructed of a first section 12 and a second section 14. These sections are arranged on either side of a central laser gas channel 16 and enclose this channel between them.

An outer laser gas channel 18 is provided on the side of the first section 12 of the discharge channel 10 remote from the central laser gas channel 16 and an outer laser gas channel 20 is provided on the side of the second section 14 remote from the central laser gas channel 16.

The central laser gas channel 16 serves preferably as a laser gas outlet channel while the two outer laser gas channels 18 and 20 are laser gas supply channels so that the first section 12 of the discharge channel 10 and the second section 14 of the discharge channel 10 each have gas flowing therethrough in a longitudinal direction 22.

A cooler 24 follows the central laser gas channel at right angles to the longitudinal direction 22. This cooler cools the discharged laser gas and is hereby supplied with cooling water via cooling water connections 26. Several radial blowers 28 are arranged next to one another on the side of the cooler 24 opposite to the central laser gas channel and these radial blowers 28 blow the cooled laser gas from the cooler 24 to the outer laser gas channels 18 and 20. In accordance with the invention, the same number of radial blowers 28 blow laser gas to both the outer laser, gas channel 18 and the outer laser gas channel 20 so that in each of the two sections 12 and 14 a flow of laser gas towards the central laser gas channel 16 results.

A mirror chamber 30 is arranged on the side of the outer laser gas channel 18 opposite the first section 12 and this accommodates a set of mirrors 32 of a resonator for the inventive gas laser with longitudinal flow.

In the same way, a mirror chamber 34 is provided on the side of the outer laser gas channel 20 opposite the second section 14 and this accommodates a set of mirrors 36 which forms, together with the set of mirrors 32, the resonator from which a laser beam 38 exits.

The first section 12 of the inventive discharge channel 10 comprises four channel elements 40 $a$–$d$ which are aligned parallel to one another with their channel axes 42 $a$–$d$ and parallel to the longitudinal direction 22.

The channel elements 40 $a$–$d$ are, in accordance with the invention, of identical design and extend between their end faces 44 and 46 which are arranged on opposite sides and at which they are provided with end openings 48 and 50, respectively.

The end faces 44 and 46 of the channel elements 40 $a$–$d$ each abut on a wall plate 52 or 54, respectively, whereby the wall plates 52 and 54 are each provided with openings 56 and 58, respectively, which are aligned with the end openings 48 and 50 and preferably have the same cross-sectional area as the end openings 48 and 50.

Therefore, the first section 12 of the discharge channel 10 has four passageways 60 $a$–$d$ formed by the channel elements 40 $a$–$d$ and the laser gas can flow through these passageways from the outer laser gas channel 18 in the longitudinal direction 22 to the central laser gas channel 16.

The second section 14 of the discharge channel 10 is of identical design to the first section 12 and, therefore, also has a total of four channel elements 62 $a$–$d$ lying next to one another. These channel elements are aligned parallel to one another with their channel axes 64 $a$–$d$ and parallel to the longitudinal direction 22. These channel elements 62 $a$–$d$ extend between two end faces 66 and 68 and have end openings 70 and 72.

The end faces 66 and 68 of the channel elements 62 $a$–$d$ also abut on wall plates 74 and 76, respectively, which, for their part, have openings 78 and 80 aligned with the end openings 70 and 72. This means that the second section 14 also forms passageways 82 $a$–$d$ for the laser gas so that this can flow from the outer laser gas channel 20 into the central laser gas channel 16.

The central laser gas channel 16 is laterally limited by the wall plates 54 and 56. In addition, the outer laser gas channels 18 and 20 are limited by the wall plates 52 and 74 on their sides facing the discharge channel.

Moreover, the channel axes 42 $a$–$d$ are arranged such that they are aligned in pairs with the respective channel axes 64 $a$–$d$, i.e. the channel axis 42$a$ of the channel element 40 is aligned with the channel axis 64$a$ of the channel element 62 and the channel axis 42$b$ of the channel element 40$b$ with the channel axis 64$b$ of the channel element 62.

In addition, the channel elements 62 $a$–$d$ of the discharge channel 10 are identically designed to one another and also identical to the channel elements 40 $a$–$d$ so that a cross section of the passageways 60 $a$–$d$ is also identical to that of the passageways 82.

Figure 2:
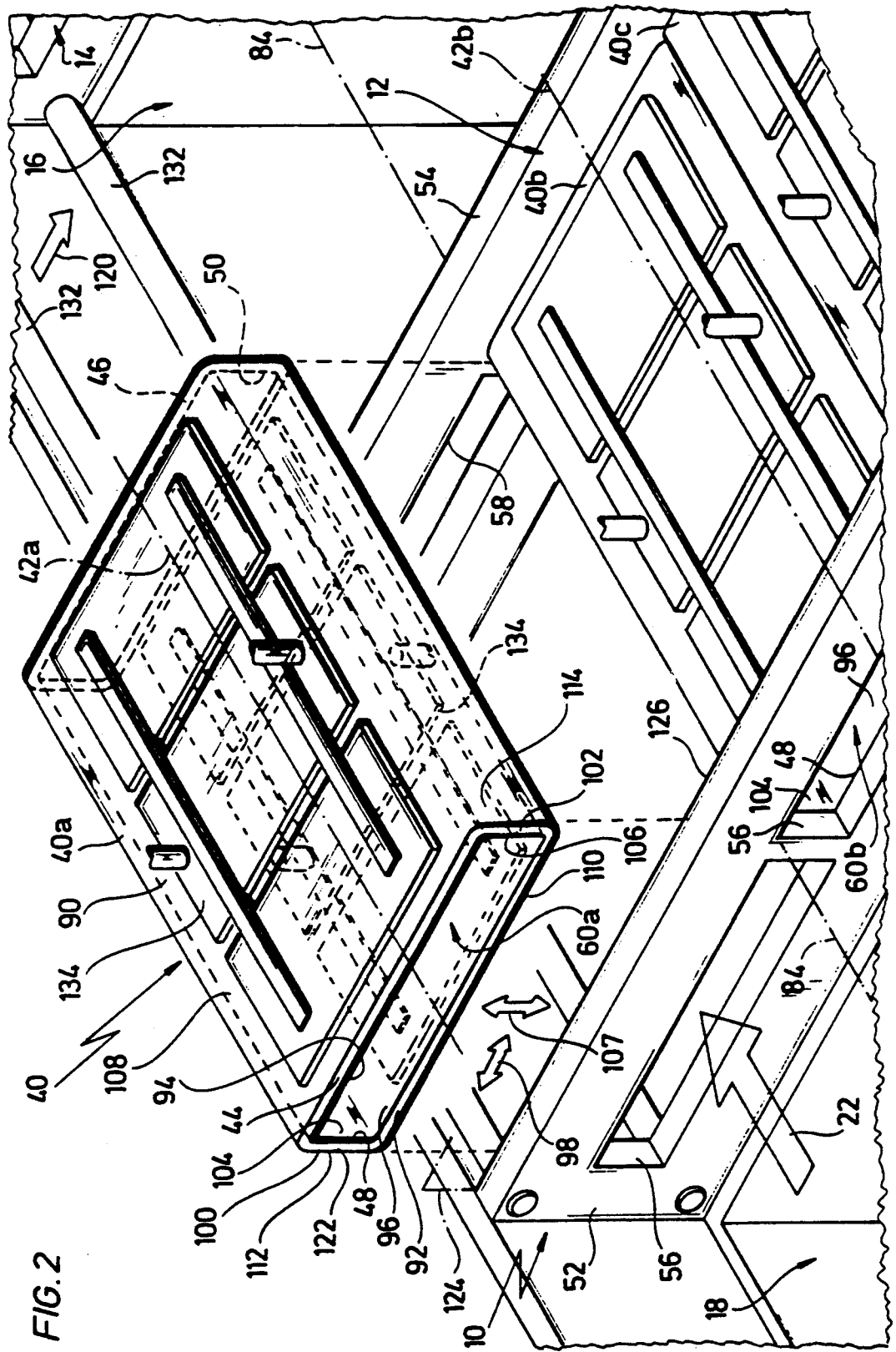
FIG. 2 is an enlarged illustration of a channel element.

Furthermore, a bundle of beams 84 extending between the sets of mirrors 32 and 36 in the longitudinal direction 22 has a cross section adapted to the passageways 60 $a$–$d$ and 82 $a$–$d$. In this inventive embodiment the sets of mirrors 32 and 36 are designed such that the bundle of beams 84 passes first of all through the passageways 60$a$ and 82$a$. It is then reflected by the set of mirrors 36 such that the bundle of beams passes through the passageways 82$b$ and 60$b$, is again reflected by the set of mirrors 32 such that it passes through the passageways 60$c$ and 82$c$ to again be reflected by the set of mirrors 36 such that it finally passes through the passageways 82$d$ and 60$d$ and, in the case of an instable resonator, exits as laser beam 38 out of a window connected with the set of mirrors 32. In the case of a stable resonator the set of mirrors 32 has a partially pervious mirror instead of the window. The channel elements 40 $a$–$d$ and 62 $a$–$d$ are, as described by way of example on the basis of a channel element 40 illustrated in FIG. 2, designed in detail as follows.

Each channel element is an integral pipe of ceramic material or quartz and having an upper transverse wall 90 and a lower transverse wall 92 which extend parallel to one another and form an upper inner wall surface 94 as well as a lower inner wall surface 96 which are aligned parallel to a first cross direction 98 and extend in spaced relation to one another.

Moreover, the upper transverse wall 90 and the lower transverse wall 92 are held in spaced relation to one another on opposite sides by side walls 100 and 102 which have inner wall surfaces 104 and 106 extending parallel to a second cross direction 107, this second cross direction 107 preferably being at right angles to the first cross direction 98.

The inner wall surfaces 94, 96, 104 and 106 therefore define an essentially rectangular inner cross section of the channel element 40 and also of the passageway 60 formed thereby.

Moreover, the upper transverse wall 90 is provided with an outer wall surface 108 and the lower transverse wall 92 with an outer wall surface 110 which likewise extend parallel to one another and preferably at the same distance from the respective inner wall surface 94 and 96 so that the upper transverse wall 90 and the lower transverse wall 92 have essentially the same thickness.

Moreover, the side walls 100 and 102 are also provided with outer side wall surfaces 112 and 114 which likewise extend parallel to one another as well as parallel to the inner wall surfaces 104 and 106 and essentially at the same distance therefrom so that the side walls 100 and 102 also have essentially the same thickness, preferably the same thickness as the upper transverse wall 90 and the lower transverse wall 92.

Each of the channel elements 40, 62 is preferably constructed as a self-supporting structure, the upper transverse wall 90 and the lower transverse wall 92 being held in spaced relation to one another by the sides walls 100 and 102 forming supporting webs. In accordance with the invention, the transverse walls 90 and 92 as well as the side walls 100 and 102 are integrally connected with one another and each of the channel elements 40, 62 is favourably produced from one piece as an integral part.

As illustrated in FIG. 1, the channel elements 40 $a$–$d$ are, in the embodiment described, located next to one another in a direction of installation 120 extending parallel to the first cross direction 98. This means that consecutive channel elements 40 are located with their outer side wall surfaces 112 and 114 next to one another and the outer side wall surfaces 114 and 112 of channel elements 40 located beside or next to one another in the direction of installation 120 preferably rest against one another.

The same applies for the channel elements 62 a–d which are of identical construction to the channel elements 40.

Figure 3:
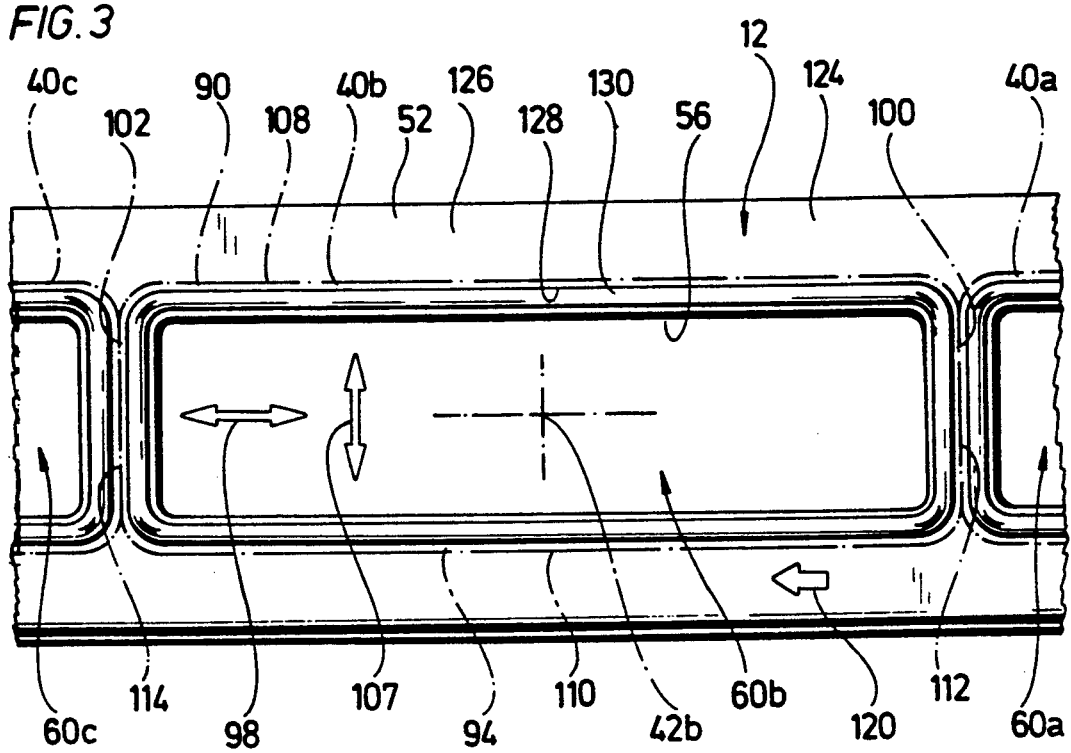
FIG. 3, is a plan view of a wall plate from the side of a channel element.
Figure 4:
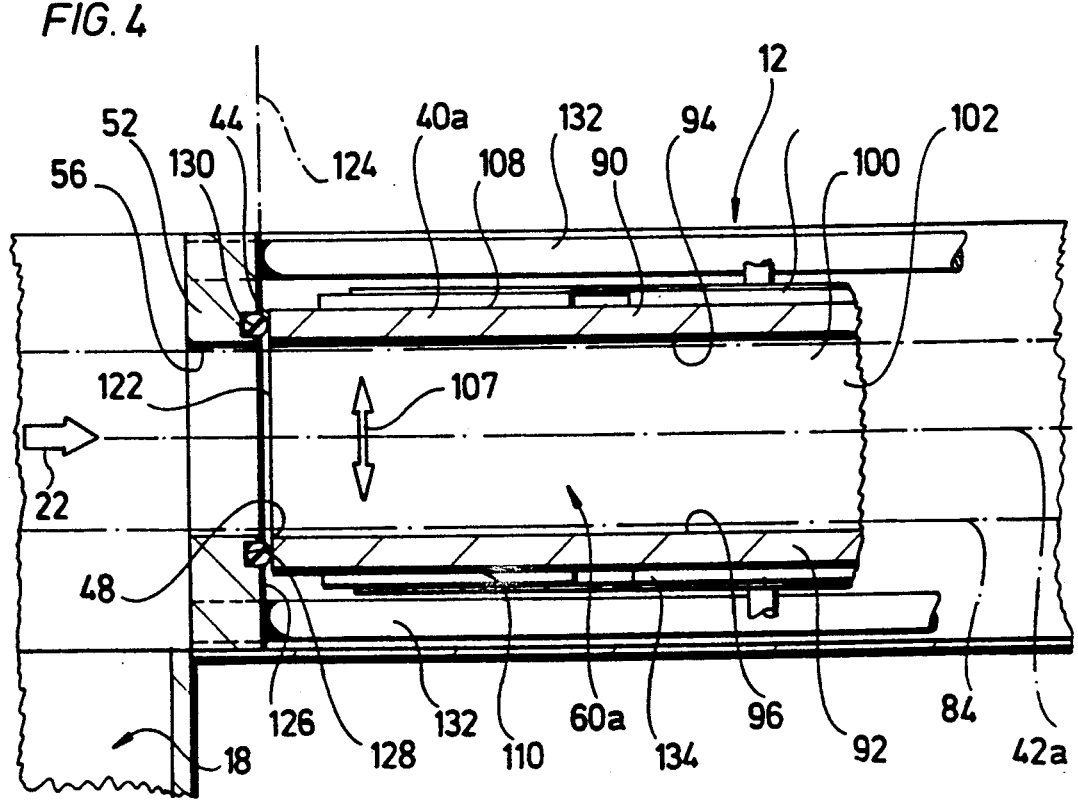
FIG. 4 is a section along line 4—4 in FIG. 1.

This means that the channel elements are supported on one another by their outer side walls 112 and 114. Moreover, as illustrated in FIG. 3 and FIG. 4, each of the channel elements 40 and 62 is sealed in relation to the respective wall plate. This will be described in the following with the example of the seal between one of the channel elements 40 and the wall plate 52, as illustrated in FIGS. 3 and 4. The channel element 40 is provided at its end face 44 with an end surface 122 which is located in a plane 124 extending parallel to a rear side 126 of the wall plate 52. Moreover, the wall plate 52 is provided with a groove 128 extending around each of its openings 56. In the groove is a seal 130 which, in the groove 128, encircles each of the openings 56 in one piece and is arranged such that when the channel element 40 abuts on the wall plate 52 the seal abuts on the end surface 122 of this channel element insofar as the opening 56 is aligned with the opening 48 in the end face of the channel element.

An adequate seal between the wall plate 52 and the channel element 40 is achieved by the seal 130 being pressed, on the one hand, into the end surface 122 and, on the other hand, into the groove 128. For this purpose, as illustrated in FIG. 1, the wall plates 52 and 54 as well as 74 and 76 are tensioned towards one another by clamping rods 132, which extend parallel to the longitudinal direction 22, so that each of the channel elements 40 and 62 is clamped between the wall plates 52 and 54 or 74 and 76, respectively, in the region of its end faces 44 and 46 as well as 66 and 68 and each seal 130 located therebetween hereby receives the necessary compression.

In addition, the clamping rods 132 are designed such that they also penetrate the central laser gas channel 16 and at the same time hold the first section 12 aligned relative to the second section 14 of the discharge channel such that the channel axes 42 are aligned with the channel axes 64.

Since the channel elements 40 and 62 have a rectangular inner cross section, the bundle of beams 84 is preferably adapted to this rectangular inner cross section so that this essentially fills the entire inner cross section of the respective passageway 60 and 82 when passing in a meandering manner through the channel elements 40 and 62, respectively, on its way from one set of mirrors 32, 34 to the other set of mirrors 34, 32.

In addition, the sets of mirrors 32 and 34 are preferably constructed such that the bundle of beams 84 is the bundle of beams of an instable resonator.

The high-frequency excitation is carried out, in accordance with the invention and as also illustrated in FIG. 1, by electrodes 134 located on the outer edge surfaces 108 and 110. These electrodes are preferably plate-like in design and extend over the entire extension of the inner wall surfaces 94 and 96 in the first cross direction 98, whereby in the longitudinal direction of the channel elements 40, 62 three electrodes in parallel connection are arranged one behind the other.

These electrodes 134 cause a high-frequency discharge in the respective passageway 60 and 82 parallel to the second cross direction 107, the high-frequency discharge hereby being essentially constant in the direction of the first cross direction 98. This means that the laser gas flowing through the respective channel element 40 and 62 is excited therein so that a laser beam in the form of a bundle of beams 84 is formed between the sets of mirrors 32 and 34.

So that the inventive channel elements 40, 62 not only contribute to the structure of the discharge channel 10 but at the same time have a dielectric for generating a uniform high-frequency discharge parallel to the second cross direction 107 and extending over the entire first cross direction 98, the channel elements themselves are produced from the dielectric material, preferably ceramics or quartz.

By selecting a dielectric material for the inventive channel elements 40, 62, all the problems with voltage sparkovers due to the high-frequency excitation are avoided due to the possibility of constructing the discharge channel 10 completely free of metal in the region of the electrodes 134. The channel elements 40, 62 do not require any metal support construction due to their self-supporting structure but themselves bear the electrodes 134 and so, in principle, as many channel elements 40, 62 as required can be arranged next to one another in the direction of installation 120.

In the embodiments as described, the laser gas $CO_2$ flows at a pressure of approximately 100 mbars and the high-frequency discharge is at a frequency of 10 to 50 MHz.

The present disclosure relates to the subject matter disclosed in German application No. P 41 02 123.1 of Jan. 25, 1991, the entire specification of which is incorporated herein by reference.

What is claimed is:

1. High-frequency excited gas laser with longitudinal flow, comprising a discharge channel having laser gas flowing therethrough in a direction of flow and high-frequency electrodes arranged on both sides of the discharge channel for generating a high-frequency discharge transversely to the direction of flow, said discharge channel comprising a plurality of channel elements, their channel axes being aligned parallel to one another in the direction of flow, said channel elements being arranged beside or next to one another in a direction of installation transverse to the direction of flow and said channel elements having a cross section with a greater extension in a first cross direction at right angles to the direction of flow than in a second cross direction extending at right angles to the first cross direction and to the direction of flow.

2. A gas laser as defined in claim 1, characterized in that the first cross direction extends parallel to the direction of installation.

3. A gas laser as defined in claim 1, characterized in that the second cross direction extends parallel to the direction of installation.

4. A gas laser as defined in claim 1, characterized in that the high-frequency discharge extends parallel to the second cross direction.

5. A gas laser as defined in claim 4, characterized int hat the high-frequency discharge is essentially constant in the direction parallel to the first cross direction.

6. Gas laser as defined in claim 1, characterized in that the channel elements have flat inner wall surfaces extending parallel to the first cross direction and lying opposite one another.

7. Gas laser as defined in claim 1, characterized in that the channel elements have flat inner wall surfaces extending parallel to the second cross direction and lying opposite one another.

8. Gas laser as defined in claim 1, characterized in that the channel elements have on opposite sides flat outer wall surfaces extending at right angles to the direction of installation.

9. Gas laser as defined in claim 1, characterized in that the channel elements have on opposite sides flat outer wall surfaces extending parallel to the direction of installation.

10. A gas laser as defined in claim 1, characterized in that the channel elements have an essentially rectangular inner cross section.

11. Gas laser as defined in claim 1, characterized in that the channel elements are penetrated by a bundle of beams having a cross section essentially adapted to the inner cross section of the channel elements.

12. A gas laser as defined in claim 1, characterized in that the channel elements are penetrated by a bundle of beams of an instable resonator.

13. Gas laser as defined in claim 1, characterized in that the discharge channel has a plurality of passageways extending on both sides of and away from a laser gas channel and being arranged in pairs to align with one another with their passageway axes.

14. A gas laser as defined in claim 13, characterized in that the laser gas channel extends in the direction of installation.

15. Gas laser as defined in claim 1, characterized in that an outer laser gas channel is arranged in both outer sides of the discharge channel, each outer laser gas channel being followed opposite the discharge channel by a mirror chamber.

16. A gas laser as defined in claim 15, characterized in that the outer laser gas channels are laser gas supply channels.

17. A gas laser as defined in claim 1, characterized in that the channel elements are produced from an electrically non-conducting material.

18. A gas laser as defined in claim 17, characterized in that the channel elements are produced from ceramics or quartz.

19. A gas laser as defined in claim 1, characterized in that the channel elements are identical in design.

20. A gas laser as defined in claim 1, characterized in that the channel elements have a self-supporting structure.

21. Gas laser as defined in claim 20, characterized in that the channel elements have an upper transverse wall and a lower transverse wall and supporting webs keeping these spaced from one another, these elements forming a continuous part.

22. A gas laser as defined in claim 20, characterized in that the channel elements are integral parts.

23. A gas laser as defined in claim 1, characterized in that the channel elements bear the electrodes.

24. A gas laser as defined in claim 1, characterized in that the channel elements are located immediately beside to one another in the direction of installation.

25. Gas laser as defined in claim 1, characterized in that the channel elements are connected with one another by supporting elements.

26. Gas laser as defined in claim 25, characterized in that the channel elements abut at their end faces on wall plates.

27. Gas laser as defined in claim 26, characterized in that all the channel elements located beside one another in a direction of installation abut with their respective end faces on a common wall plate.

28. Gas laser as defined in claim 26, characterized in that the wall plates are held by anchoring rods so as to be tensioned towards one another.

29. Gas laser as defined in claim 1, characterized in that the channel elements have in their end faces openings with a sealing surface located in a plane and encircling the openings in one piece.

* * * * *